United States Patent
Patel et al.

(10) Patent No.: US 10,196,541 B2
(45) Date of Patent: Feb. 5, 2019

(54) ONE-STEP FLOOR FINISH

(71) Applicant: THE SHERWIN-WILLIAMS COMPANY, Cleveland, OH (US)

(72) Inventors: Yamini D Patel, East Brunswick, NJ (US); Thomas E Kinlin, Nutley, NJ (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 15/417,429

(22) Filed: Jan. 27, 2017

(65) Prior Publication Data

US 2017/0233603 A1   Aug. 17, 2017

Related U.S. Application Data

(60) Provisional application No. 62/288,005, filed on Jan. 28, 2016.

(51) Int. Cl.
| | |
|---|---|
| *C09D 175/04* | (2006.01) |
| *C09D 5/14* | (2006.01) |
| *C09K 13/00* | (2006.01) |
| *C08L 75/04* | (2006.01) |

(52) U.S. Cl.
CPC ............ *C09D 175/04* (2013.01); *C08L 75/04* (2013.01); *C09D 5/14* (2013.01)

(58) Field of Classification Search
None
See application file for complete search history.

(56) References Cited

U.S. PATENT DOCUMENTS

| | | | | |
|---|---|---|---|---|
| 4,103,050 A | * | 7/1978 | Laskin | C09D 5/08 427/380 |
| 4,952,617 A | * | 8/1990 | Ayala | C08J 3/226 106/169.51 |
| 5,891,950 A | * | 4/1999 | Collins | C08F 220/28 524/502 |
| 6,608,131 B1 | * | 8/2003 | Winterowd | C08K 5/0008 428/194 |
| 9,777,173 B2 | * | 10/2017 | Moore | C09D 11/322 |
| 2005/0154111 A1 | * | 7/2005 | Levitt | C08G 18/222 524/424 |
| 2006/0209149 A1 | * | 9/2006 | Hasegawa | C09D 11/322 347/100 |
| 2007/0088117 A1 | * | 4/2007 | Zhou | C08J 3/05 524/539 |
| 2012/0107508 A1 | * | 5/2012 | Li | C09D 175/04 427/355 |
| 2012/0165435 A1 | * | 6/2012 | Santhanam | C09D 11/03 524/88 |
| 2012/0201963 A1 | * | 8/2012 | Li | C08G 18/0852 427/355 |
| 2017/0233603 A1 | * | 8/2017 | Patel | C09D 175/04 523/122 |

* cited by examiner

*Primary Examiner* — Peter A Salamon

(57) ABSTRACT

A floor finish, in various embodiments, includes a water-based pigment dispersion and a topcoat formulation having (i) a drier-free water-based polyurethane dispersion, (ii) co-solvents in an amount chosen to achieve a cure time of the finish within a target range, (iii) a metal drier for adjusting the cure time within the target range, and (iv) a surfactant for creating a smooth and flat coating.

14 Claims, 1 Drawing Sheet

ONE-STEP FLOOR FINISH

RELATED APPLICATION

This application claims the benefit of and priority to U.S. Provisional Patent Application No. 62/288,005, filed Jan. 28, 2016, the entire disclosure of which is hereby incorporated by reference.

TECHNICAL FIELD

The subject matter hereof relates to a floor finish, and in particular, to finish compositions that allow a floor to be finished in a single step.

BACKGROUND

Wood floors are frequently employed in quality housing and offices. The bare wood is typically treated with a "finish" for aesthetic purposes and to provide protection to the wood surface from wear and deterioration. Conventionally, a wood-finishing process includes application of a layer of stain to color the bare wood followed by separate application of a topcoat (e.g., a wax or polyurethane) layer to provide the desired protection and bright appearance of the floor. Thus, the finishing process is split into at least two steps using two products separately, which is especially time-consuming in that, prior to application of the topcoat, it is generally necessary to wait for the stain layer to be completely dry.

In addition, if a change of the floor color is desired, the conventional process requires removing the stain layer and thus the finished wood has to be sanded down to bare wood to remove the stain layer from the wood. This process may generate dust or fumes that contain lead; exposure to the lead dust or fumes may cause brain damage or other adverse health effects, especially in children or pregnant women.

Consequently, there is a need for a finish material that simplifies the wood-finishing process and reduces the working time as well as changing the floor color without generating excessive dust or fumes.

SUMMARY

In various embodiments, the present invention relates to a floor finish that allows the wood floor to be finished in a single step—i.e., there is no need to wait for the stain layer to dry before applying a topcoat. In one implementation, the finish includes a single-formula mixture having a water-based pigment dispersion and a topcoat formulation; application of the single-formula mixture provides a desired color and hardness/protection for the coating film at the same time. In various embodiments, the topcoat formulation consists essentially of a drier-free water-based polyurethane dispersion, co-solvents, a metal drier (i.e., a catalyst such as zirconium, cobalt, barium, or a combination thereof), and a surfactant. The water-based polyurethane dispersion provides a desired durability for the topcoat and has low amounts of volatile organic compounds (VOCs) compliant with VOC worldwide regulations (or at least the standards applicable in North America). The co-solvents serve to prevent lapping marks when the mixture is applied to the wood. In addition, the co-solvents advantageously provide the user with the ability to tailor the cure time of the topcoat to a desired time range via adjusting the amounts thereof. In one embodiment, the cure time can be further fine-tuned to a target time via an addition of the metal drier that acts as a catalyst. The metal drier may also serve to develop hardness of the coating film.

In addition, because the formula mixture may adhere to an existing finish, a change of the floor color may be advantageously achieved by simply applying the formula mixture over the existing finish without sanding down to the bare wood. In some embodiments, the existing finish is slightly abraded (i.e., lightly scuffed) so as to create a rough surface and thereby ensure adhesion of the applied formula mixture thereto. Finally, the surfactant allows a smooth and flat topcoat to be created while effectively avoiding foaming and film defects. Accordingly, single-formula mixtures in accordance herewith may protect and impart a desired color to wood floors as well as to conventional finish materials, while advantageously limiting dust/fume generation and reducing the finishing process to one step and, if desired, shortening the cure time of the finish.

Accordingly, in one aspect, the invention pertains to a floor finish composition. In various embodiments, the composition comprises, consists essentially of or consists of a water-based pigment dispersion and a topcoat formulation including, consisting essentially of or consisting of (i) a drier-free water-based polyurethane dispersion, (ii) co-solvents in an amount chosen to achieve a cure time of the finish within a target range, (iii) a metal drier for adjusting the cure time within the target range, and (iv) a surfactant for creating a smooth and flat coating.

In addition, the floor finish may include a defoamer to break foam generated during formulation processing and/or application of the finish to the floor. In some embodiments, the floor finish further includes an anti-bacterial preservative to prevent degradation by microbes. Further, the floor finish may include a thickening agent to adjust the viscosity of the finish. In one embodiment, the floor finish includes an additive to prevent the pigment from settling. In various embodiments, the floor finish includes a matting agent to adjust a gloss level of the finish. In addition, the floor finish may further include an anti-sagging agent to prevent the matting agent from settling.

In another aspect, the invention relates to a method of manufacturing a floor finish. In various embodiments, the method includes forming, in a first vessel, a topcoat formulation including (i) a drier-free water-based polyurethane dispersion, (ii) co-solvents in an amount chosen to achieve a cure time of the finish within a target range, (iii) a metal drier for adjusting the cure time within the target range, and (iv) a surfactant fix creating a smooth and flat coating; transferring the topcoat formulation to a second vessel; and adding a pigment to the second vessel.

In some embodiments, the method further includes adding a defoamer in the first vessel so as to break foam generated during formulation processing and/or application of the finish to a floor. In addition, the method may include adding an anti-bacterial preservative in the first vessel so as to prevent degradation by microbes. Further, the method may include adding a thickening agent in the first vessel so as to adjust the viscosity of the finish. In one embodiment, the method includes adding an additive in the first vessel so as to prevent the pigment from settling. In various embodiments, the method includes adding a matting agent in the first vessel so as to adjust a gloss level of the finish. In addition, the method may include adding an anti-sagging agent in the first vessel so as to prevent the matting agent from settling.

As used herein, the term "substantially" means ±90%, and in some embodiments, ±80 The term "consists essentially of" means excluding other materials that contribute to function or structure. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The foregoing will be more readily understood from the following detailed description of the invention in conjunction with the drawing, in which.

DESCRIPTION

Figure 1:
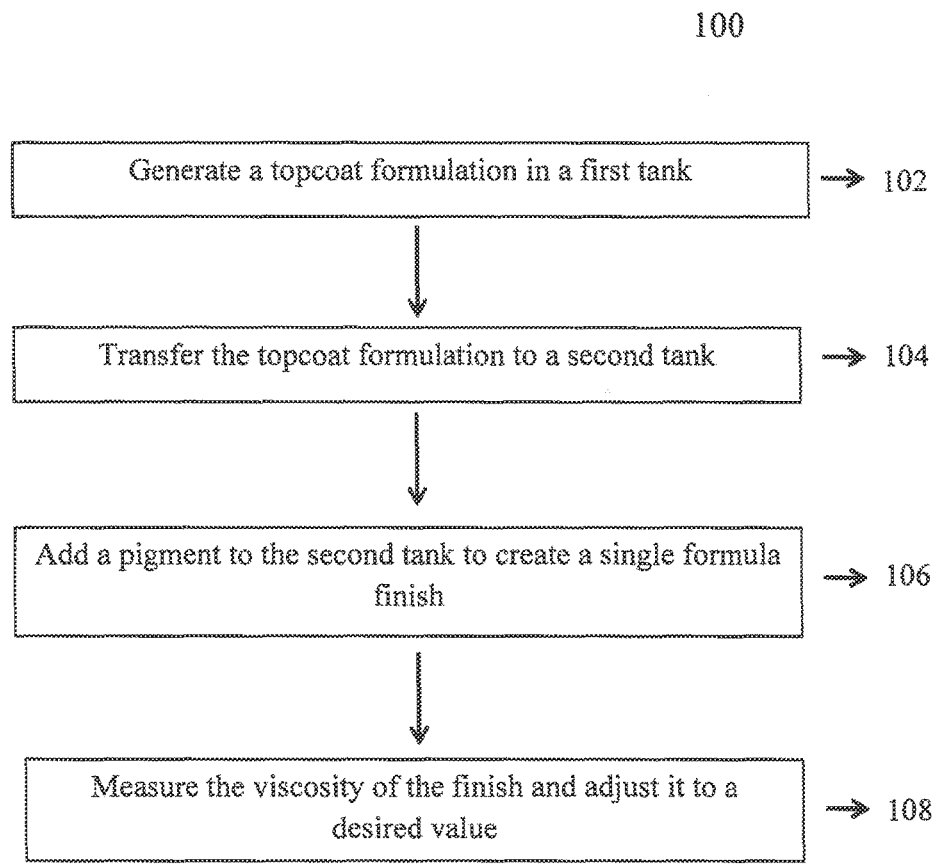
FIG. 1 illustrates a method of creating a finish mixture in accordance with various embodiments of the current invention.

In various embodiments, a finish material in accordance herewith includes a single formulation comprising, consisting essentially of or consisting of a mixture of a water-based pigment dispersion and a topcoat formulation. The water-based pigment dispersion provides a desired color (such as light brown, medium brown, dark brown, reddish brown, or any color as shown in the below table) to match to or adjust the color of bare or previously finished wood.

TABLE 1

| Color | Size | Sheen | Item Number | UPC Code |
| --- | --- | --- | --- | --- |
| Autumn Wheat | Gallon | Gloss | 672000000 | 027426672000 |
| Autumn Wheat | Gallon | Satin | 672010000 | 027426672017 |
| Acorn Brown | Gallon | Gloss | 672020000 | 027426672024 |
| Acorn Brown | Gallon | Satin | 672030000 | 027426672031 |
| Aged Leather | Gallon | Gloss | 672040000 | 027426672048 |
| Aged Leather | Gallon | Satin | 672050000 | 027426672048 |
| Brandywine | Gallon | Gloss | 672060000 | 027426672062 |
| Brandywine | Gallon | Satin | 672070000 | 027426672079 |
| Gunstock | Gallon | Gloss | 672080000 | 027426672086 |
| Gunstock | Gallon | Satin | 672090000 | 027426672093 |

Various conventionally available water-based pigment dispersions may be suitable for use herewith. For example, VOC-free KEYSPERSE products, which are acrylic resin-based, aqueous pigment dispersions, are well-suited to a single-formula mixture. The exemplary pigment dispersion detailed below includes KEYSPERSE contents of about 0.04-0.4 wt. %. The types and amounts of KEYSPERSE may be adjusted to produce a desired color.

In some embodiments, the topcoat formulation includes a water-based coating composition. In various embodiments, the water-based coating composition comprises or consists essentially of a drier-free polyurethane resin (such as NEO-REZ) of about 80 wt. %. The polyurethane resin contains limited amounts of VOCs that can comply with the world-wide VOC standards (or at least the standards applicable in North America). The polyurethane resin is also known to provide good resistance to chemicals, oil, and mechanical forces, and thereby advantageously provides the durability needed for a protective floor topcoat. In some embodiments, the topcoat formulation further includes co-solvents (such as one or more glycol ethers and/or dipropylene glycol methyl ether) in the range of about 0.5-6 wt. % to help formation of the coating film and prevent lapping marks when applying the single formula mixture to the wood floor. In addition, because the amount of co-solvents) may affect the cure time of the single-formula finish, the user may tailor the cure time to a desired time range (e.g., between from two to 24 hours) by adjusting the amount of co-solvent. In various embodiments, the cure time of the finish mixture is further fine-tuned by introducing a metal drier (such as Zr, Co, Ba, or a combination thereof) in the range of about 0.1-1 wt. % to the mixture. Because the metal drier acts as a catalyst in the curing process, the cure time may be reduced. Preferably, the finish mixture is cured in less time than is required for conventional formulations while still allowing the coating film to be smoothly applied. This goal can be achieved by varying the amounts of co-solvent and metal drier contained in the topcoat formulation. The addition of the metal drier may also enhance the hardness of the coating film.

In various embodiments, the topcoat formulation further includes a surfactant, such as a BYK product (BYK 346 or BYK 347), of about 0.1-1 wt % to improve wood wetting and providing leveling—i.e., creating a smooth and flat coating and avoid foaming and defects on the coating film. The topcoat formulation may also include a defoamer, such as BYK 028, in the range of about 0.1-0.5 wt. % to break foam generated during formula processing and/or application of the finish mixture onto the floor. In addition, the topcoat formulation may include an anti-bacterial preservative (such as KATHON) in the range of about 0.05 wt. % to prevent degradation by microbes. Further, a thickening agent (such as ACRYSOL) in the range of about 0.1-0.5 wt. % may be added into the topcoat formulation to adjust the viscosity to a desired value. Finally, the topcoat formulation may include an additive (such as DISPARLON) in the range of about 0.5-2 wt. % to prevent pigment settling (after mixing the topcoat formulation with the pigment dispersion).

It is also preferable to have various sheens for the finish. In one embodiment, the finish mixture two types of sheens—gloss and satin. To reduce the gloss level and create a satin finish, the topcoat formulation may include a matting agent (such as ACEMATT) of about 0.5-1 wt. %, and an anti-sagging agent (such as AEROSIL) of about 0.1-0.5 wt. % to keep the matting agent from settling. Additionally, the matting agent may be used to produce a smooth and even satin finish.

Tables 2 and 3 below illustrate representative formulations of a clear portion and a pigment dispersion, respectively, of a formula mixture in accordance herewith. The clear portion and pigment dispersion are made in separate tanks. When the clear portion is completed, it is transferred into another tank and the pigment dispersion is added therein.

TABLE 2

| Type | Component | Description | Amount | UM | Like UM GL | Weight % |
|---|---|---|---|---|---|---|
| Raw Material | 490986 | NEOREZ R-9035 | 5,940.5184 | LB | 689.1553 | 25.3100% |
| Raw Material | 491566 | BYK-028 SILICONE DEFOAMER | 23.4710 | LB | 2.7009 | 0.1000% |
| Raw Material | 601920 | AEROSIL 200, AMORPHOUS FUMED SILICA | 98.5783 | LB | 5.3868 | 0.4200% |
| Raw Material | 496117 | DISPARLON AQH-800 | 237.0574 | LB | 28.5268 | 1.0100% |
| Raw Material | 496171 | DISPARLON AQ-330 | 178.3799 | LB | 20.4330 | 0.7600% |
| Raw Material | 490986 | NEOREZ R-9035 | 12,716.6056 | LB | 1,475.2443 | 54.1800% |
| Raw Material | 045111 | PROPYLENE GLYCOL, IND. | 1,377.7496 | LB | 159.8317 | 5.8700% |
| Raw Material | 491566 | BYK-028 SILICONE DEFOAMER | 46.9421 | LB | 5.4018 | 0.2000% |
| Raw Material | 512010 | WATER | 1,213.4524 | LB | 146.0232 | 5.1700% |
| Raw Material | 097117 | ADDITOL VXW 4940, ZR/CO/BA DRIER | 119.7023 | LB | 13.0965 | 0.5100% |
| Raw Material | 512010 | WATER | 237.0574 | LB | 28.5268 | 1.0100% |
| Raw Material | 512010 | WATER | 119.7023 | LB | 14.4046 | 0.5100% |
| Raw Material | 247244 | KATHON LX/ACTICIDE RS/PREVENTOL D7 | 11.7355 | LB | 1.3806 | 0.0500% |
| Raw Material | 041312 | DIPROPYLENE GLYC METH ETHR, DPM | 213.5864 | LB | 27.0021 | 0.9100% |
| Raw Material | 454086 | MICROSPERSION 1406 | 474.1149 | LB | 41.6621 | 2.0200% |
| Raw Material | 491846 | BYK-346 | 70.4131 | LB | 8.5040 | 0.3000% |
| Raw Material | 491124 | BYK-347 POLYETHER MOD. POLYSILOXANE | 178.3799 | LB | 21.0354 | 0.7600% |
| Raw Material | 601320 | ACEMATT TS-100 | 213.5864 | LB | 11.6842 | 0.9100% |

TABLE 3

| | | | |
|---|---|---|---|
| T-1000 T-1000 | 7,041.7042 | LB | 810.000 |
| FORMULA IS A TWO TANK PROCESS | | | |
| FIRST TANK REQUIRES A COWLESS BLADE | | | |
| USE CLEARS TANK FOR INTERMEDIATE TRANSFER TO SAINT TANK | | | |
| FOR PIGMENT ADD | | | |
| Triple Check all R Codes | | | |
| Wear Appropriate PPE: | | | |
| CHARGE TANK WITH | | | |
| MW Complete Satin Base | 805.6711 | GL | 805.6711 99.4600% |
| TRANSFER BULK TO STAINS TANK BEFORE ADDITION OF PIGMENT DISPERSIONS | | | |
| ADD | | | |
| KEYSPHERSE NSR BLACK 110-207-66 | 2.6167 | LB | 0.3095 0.0400% |
| KEYSPHERSE NSR BROWN 310-223-66 | 21.1251 | LB | 2.4006 0.3000% |
| RUN 10 MIN BEFORE PROCEEDING | | | |
| Wear Appropriate PPE: Apron Face Shield | | | |
| CHECK VISCOSITY. | | | |
| IF VISCOSITY IS LOW ADJUST WITH 490946 ACRYSOL RM-825 | | | |
| ADD 490946 ACRYLSOL RM-825 IN 25% | | | |
| INCREMENTS WITH A 20 MINUTE SPIN BETWEEN ADDS UNTIL | | | |
| VISCOSITY IS IN SPEC | | | |
| CHECK VICOSITY AFTER EACH ADD | | | |
| ADD | | | |
| ACRYSOL RM-825 (6-8862) | 14.0834 | LB | 1.6188 0.2000% |
| RUN AGITATOR 20 MINUTES AT 500 RPM | | | |
| BRING SAMPLE TO LAB | | | |
| T-1000 T-1000 | 0.0000 | LB | 0.0000 |
| FILTER WITH 40 MICRON (MESH) | | | |
| CONFIRM LABEL SCANNER YES___NO___ N/A___ | | | |

FIG. 1 depicts an approach 100 for creating a single-formula floor finish in accordance with various embodiments of the current invention. In a first step 102, various ingredients as described above are added into a first tank to generate a topcoat formulation. The first tank contains a high-speed mixer having a cowles blade in order to mix the ingredients thoroughly and create a homogeneous formulation. In a second step 104, the formulation is transferred to a second tank. In a third step 106, the pigment dispersion is added into the second tank to create a single-formula finish having a desired color. Optionally, in a fourth step 108, the viscosity of the finish is measured and adjusted to a desired value via the use of, for example, acrysol. The single-formula finish is then ready to be applied to bare wood floors using, for example, a painters pad or a synthetic lambswool applicator. Typically, one to three coats may be necessary to create a desired color and protection; additional layers may produce a deeper color.

In an embodiment, the formula finish substantially adheres to an existing finish (which may be a conventional finish or a finish as described herein). Thus, formula finishes in accordance herewith can also be applied to previously finished wood floors without first removing the existing finish as required in a conventional wood-finishing process. In addition, if it is desired to change the current color of the floor, the formula finish may be made with the desired color by adjusting the types and amounts of the pigment contents and subsequently applied over the current finish. Again, no sanding between the layers of coating is necessary, and one or more layers of the formula finish may be applied. Accordingly, the single-formula finishes disclosed herein advantageously obviate the need to sand the floor down to the bare wood as in the conventional process for changing the color, thereby limiting the generation of hazardous dusts and/or fumes.

Further, because the finishes described herein provide a single-formula mixture that comprises, consists essentially of or consists of a stain and protective coating, the wood floor may be finished in a single step—i.e., there is no need to wait for the stain layer to dry before applying a coating layer, thereby significantly saving processing time compared with the conventional products.

While the invention has been described in conjunction with the specific embodiments thereof, one of ordinary skill in the art will understand that any alternatives, modifications, and variations of the types of the ingredients and/or the amounts thereof contained in the single-formula finish are possible and are they within the scope of the present invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A floor finish comprising:
a water-based pigment dispersion; and
a topcoat formulation including (i) a drier-free water-based polyurethane dispersion, (ii) co-solvents in a range of 0.5-6 wt % so as to achieve a cure time of the finish within a target range of 2-24 hours, (iii) a metal drier for adjusting the cure time within the target range, and (iv) a surfactant for creating a smooth and flat coating.

2. The floor finish of claim 1, further comprising a defoamer to break foam generated during formulation processing and/or application of the finish to the floor.

3. The floor finish of claim 1, further comprising an anti-bacterial preservative to prevent degradation by microbes.

4. The floor finish of claim 1, further comprising a thickening agent to adjust the viscosity of the finish.

5. The floor finish of claim 1, further comprising an additive to prevent the pigment from settling without changing a viscosity of the topcoat formulation.

6. The floor finish of claim 1, further comprising a matting agent to adjust a gloss level of the finish.

7. The floor finish of claim 6, further comprising an anti-sagging agent to prevent the matting agent from settling.

8. A method of manufacturing a floor finish comprising:
forming, in a first vessel, a topcoat formulation including (i) a drier-free water-based polyurethane dispersion, (ii) co-solvents in a range of 0.5-6 wt % so as to achieve a cure time of the finish within a target range of 2-24 hours, (iii) a metal drier for adjusting the cure time within the target range, and (iv) a surfactant for creating a smooth and flat coating;
transferring the topcoat formulation to a second vessel; and
adding a pigment to the second vessel.

9. The method of claim 8, further comprising adding a defoamer in the first vessel so as to break foam generated during formulation processing and/or application of the finish to a floor.

10. The method of claim 8, further comprising adding an anti-bacterial preservative in the first vessel so as to prevent degradation by microbes.

11. The method of claim 8, further comprising adding a thickening agent in the first vessel so as to adjust the viscosity of the finish.

12. The method of claim 8, further comprising adding an additive in the first vessel so as to prevent the pigment from settling without changing a viscosity of the topcoat formulation.

13. The method of claim 8, further comprising adding a matting agent in the first vessel so as to adjust a gloss level of the finish.

14. The method of claim 13, further comprising adding an anti-sagging agent in the first vessel so as to prevent the matting agent from settling.

* * * * *